Dec. 30, 1952    F. M. BOWER    2,623,928
CAPACITOR CELL FOR PIPELINE BATCHING
Filed Oct. 18, 1950    2 SHEETS—SHEET 1

Francis M. Bower Inventor
By W. O.␣Hilman Attorney

Patented Dec. 30, 1952

2,623,928

UNITED STATES PATENT OFFICE 2,623,928

CAPACITOR CELL FOR PIPELINE BATCHING

Francis M. Bower, Tulsa, Okla., assignor to Standard Oil Development Company, a corporation of Delaware Application October 18, 1950, Serial No. 190,831

3 Claims. (Cl. 175—183)

This invention relates to an improved capacitor cell or chamber for measuring dielectric properties of a flowing stream of fluid. More particularly it relates to an electrical capacitor cell that is especially adapted for use in detecting changes in batches of petroleum liquids flowing through pipelines by noting a change in the dielectric properties of the liquid stream.

One of the common means of transporting crude oils and petroleum products is through pipelines. It is a usual practice, in order to make the fullest use of pipeline facilities, to send successive batches of different crudes or of different intermediate or finished products through the same pipeline. A standard technique for determining the position of the batch head as well as the spread of contamination on products systems is by measurement of the gravity with a hydrometer on samples withdrawn from the line. This same procedure is also used on crude oil lines. Both products and crude lines make some use of automatic gravitometers, principally to furnish a check on uniformity within the batch rather than to measure and record the exact batch change. This procedure is followed because usually such automatic devices operate continuously and over a wide gravity range and hence do not have sufficient sensitivity to give the minute control necessary in determining the cut point.

Pipelines handling finished products can be designed for minimum contamination because operating conditions are relatively fixed. On the other hand, pipeline systems for crude oils must retain flexibility to accommodate the varying quality and quantities of crude furnished. It is necessary to segregate the various types of crudes when they reach the refinery because of the difference in the nature and quantity of products that can be most economically made from each type of crude oil. If contamination occurs by the admixture of one type of crude with another an economic loss results because part of the crude must then go into a refining process for which it is not best suited. Differences in gravity cannot always be relied upon for determining cut points between batches of crude oil because in many instances the gravities of successive batches may be too closely similar. This is not a serious problem when handling finished products since, when the successive batches of the latter are of essentially the same gravity, color changes in the samples withdrawn from the pipeline can be employed as a control test. If the two products are colorless or of the same color a plug of an appropriately colored dye may be inserted between batches and proper control established by color comparison. The color comparison technique cannot be employed reliably in the handling of crude oil, however, because of the opaque nature of most crudes; hence cuts must be made on the basis of calculation of capacity of the pipe line as related to the size of the batch being sent through when the cut cannot be determined by gravity measurements.

It is thus apparent that there has been a need for a more satisfactory method of determining when a batch change occurs in a pipe line handling successive batches of crude oils of different types. It has recently been found that cut points between successive crude oil batches can be determined by continuously measuring the dielectric properties of the liquids flowing through the pipe line and noting a batch change when either the dielectric constant or the power factor characteristics of the liquid stream change.

Briefly the method consists in diverting a sidestream of the fluid flowing through the line at a selected point and conducting the sidestream through a chamber containing a capacitor that is connected into a bridge circuit fed by an oscillator. The fluid thus acts as the dielectric for the capacitor. The bridge is balanced for the particular liquid in the chamber and will remain in balance until a liquid of a different dielectric constant or a different dielectric power factor enters the chamber. Thus unbalance of the bridge serves to indicate a batch change. A suitable method and apparatus for detecting batch changes in this manner is described and claimed in co-pending application Serial No. 190,819 of William A. Bruce, filed October 18, 1950.

One of the difficulties encountered in the operation of the method has been the lack of a reliable capacitor cell for the diverted sample stream. For example it was found that some types of cells would tend to cause instrument drift, that is a drift in measured power factor and capacitance values would occur while continuous measurements were being made on the same oil.

In accordance with the present invention a capacitor cell of novel design is furnished which is free from drift effects and which provides a minimum of interference from condensation of moisture in the cell. Moreover the cell of this invention is devised for a minimum of change in electrical properties of the cell as a result of wear on the cell parts by the flowing stream of oil.

The nature and objects of the invention and the manner in which it is to be employed, as well as the advantages over capacitor cells of earlier design will be apparent from the ensuing description and from the accompanying drawings in which.

Figure 1:
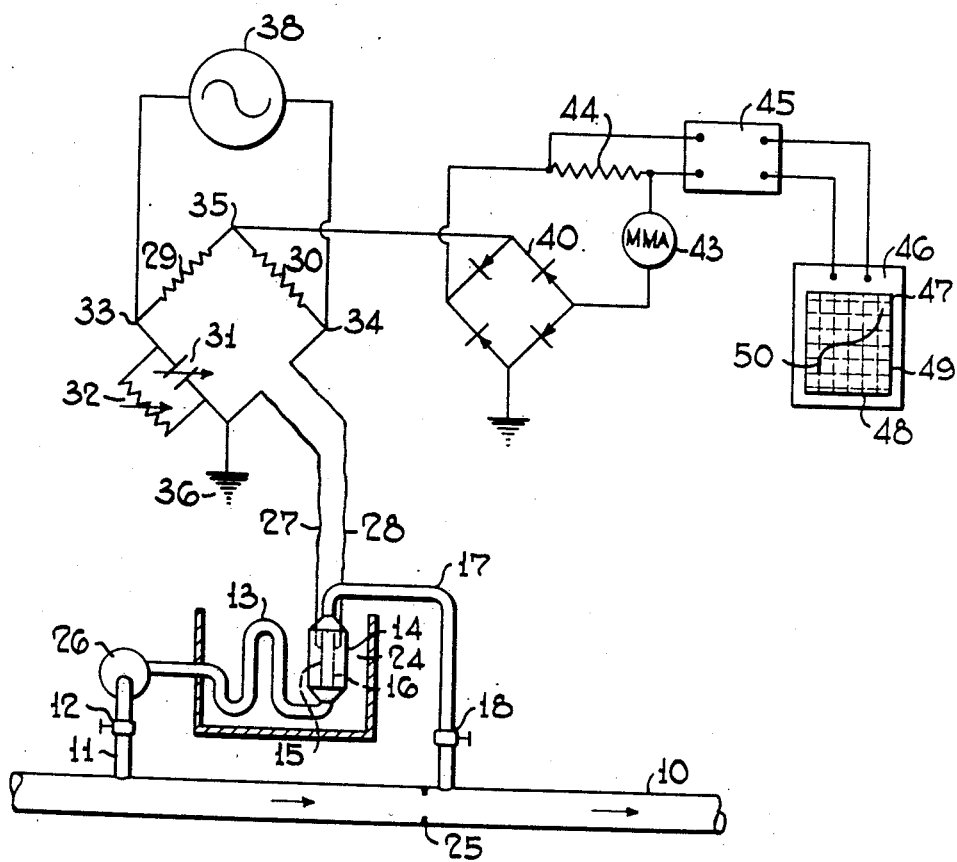
Fig. 1 is a schematic diagram showing the general arrangement of suitable means for sampling liquids flowing through a pipeline, together with a bridge circuit and a recording circuit for measuring changes in the dielectric properties of the liquid sample.

Referring now particularly to Figure 1, it is seen that a sampling line 11 is cut into pipeline 10 at or near the point at which the batch change is to be detected. The proper pressure differential to ensure flow of the sample side stream through the sampling line may be obtained by placing a constriction 25 in the pipeline ahead of the return line 17 or by employing a small pump 26. Valves 12 and 18 are provided for closing off the sampling line when not in use. The side stream flows through a capacitor cell 14 where it serves as the dielectric for a capacitor made up of plates 15 and 16. Since temperature variations may affect the readings, a coil 13 immersed in a constant temperature bath 24 may be used in order to bring the fluid to a desired temperature before passing it through the capacitor cell. Best results will be obtained by having both coil 13 and capacitor cell 14 immersed in the constant temperature bath.

The capacitor comprising plates 15 and 16 is connected into and forms one arm of a modified capacitance bridge circuit, two of the other arms of which consist of two fixed resistors 29 and 30. The balancing arm of the bridge consists of a variable capacitor 31 across which is shunted a variable resistor 32. The bridge is fed at points 33 and 34 by oscillator 38 which is preferably one having a variable adjustment for both frequency and voltage. The output of the capacitance bridge at points 35 and 36 is fed into a full wave bridge rectifier 40. For convenience, point 36 is tied to the common ground of the circuit. The rectified voltage is fed into a recorder 46, having first been amplified, if necessary by a suitable amplifier 45. Recorder 46 is equipped with a moving chart 47 having coordinates 48 and 49 to indicate changes in measured voltage with time. The record made on the chart is represented by line 50.

When the bridge is energized by the oscillator, the bridge is balanced by adjusting capacitor 31 and resistor 32 so that the resistance and capacitance of the variable arm will be exactly equal to the resistance and capacitance of the capacitor comprising plates 15 and 16 and the particular liquid then flowing through the capacitor cell. Adjustment of capacitor 31 will set the bridge for the dielectric constant of the particular liquid in the cell while adjustment of resistor 32 will set the bridge for the dielectric power factor of the particular liquid in the well. Both adjustments must be made to bring the bridge into balance. Hence, it follows that, at the time of a batch change, that is when a second liquid having either a different dielectric constant or a different dielectric power factor than the first liquid passes through the cell, the bridge will become unbalanced, and a voltage difference will occur across terminals 35 and 36. This voltage will be rectified by bridge rectifier 40, the rectified voltage will be fed into amplifier 45, and the amplified voltage will be fed into recorder 46. A shift in the position of recorded line 50 on chart 47 will indicate that a batch change has occurred. The output from rectifier 40 may be fed directly into the amplifier or, preferably, as shown in Figure 1, it may be loaded by the resistor 44 and a microammeter placed in the line to serve as a check on the reading on the recorder.

In the actual operation of the instrument the instrument sensitivity is adjusted by setting the oscillator output voltage to a level which has been determined by test to give the optimum shift on the recorder for the particular change in dielectric constant and/or dielectric power factor that is expected to occur. With a sample stream of the liquid from the pipeline flowing through the capacitor cell 14, the capacitance bridge is balanced by alternating adjustment of the two bridge balance controls, that is capacitor 31 and resistor 32. Microammeter 43 is employed as an indicator for major adjustment of the bridge and then as a balance of the bridge is approached and the recorder reads at or about zero on the scale, the recorder itself is used as the indicator of balance. Balance is obtained when the recorder reads at its minimum or as near zero as possible.

Figure 2:
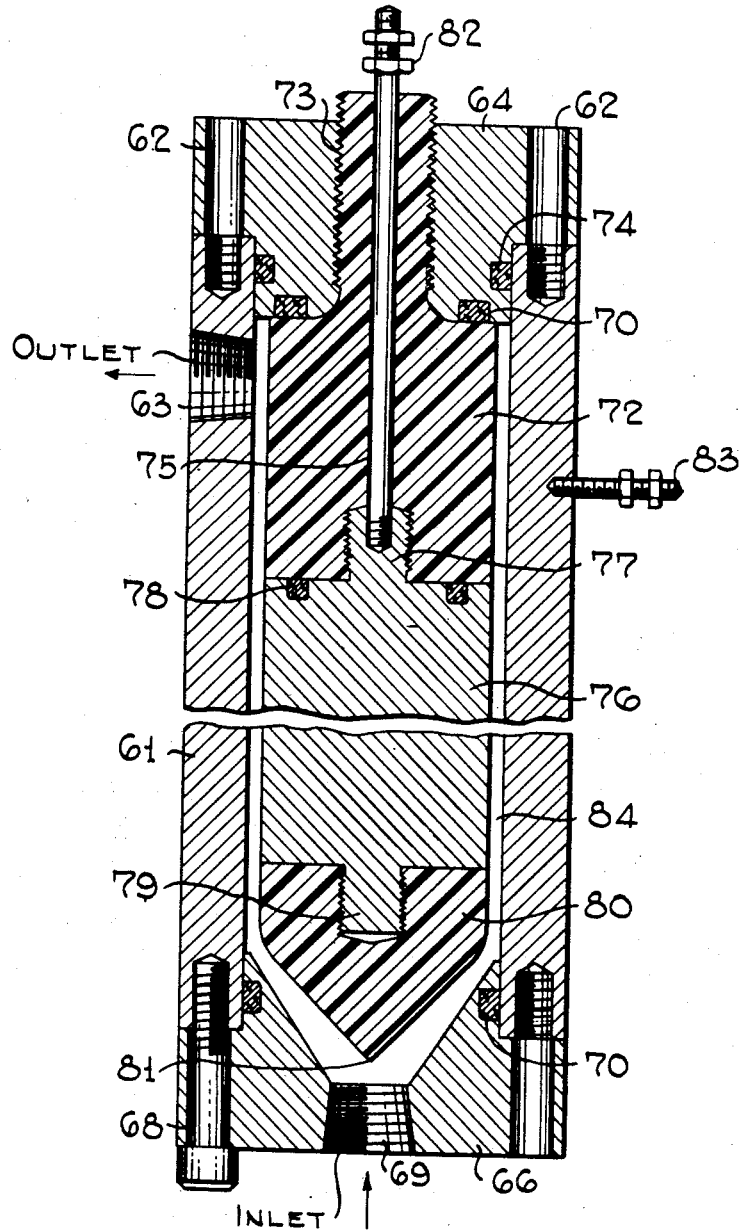
Fig. 2 is a vertical sectional view of a capacitor cell constructed in accordance with the present invention.

As mentioned above, for successful operation of a pipeline batching instrument of the type just described a reliable capacitor cell must be employed. Such a cell, superior in performance to previous cells, is provided by the present invention, one embodiment of which is shown in Fig. 2. The cell consists of an outer cylindrical tube 61, having at each end threaded opening 62 which receive threaded bolts 68, holding in position top and bottom end members 64 and 66. A threaded central inlet 69 is positioned in the bottom end member 66 and a threaded outlet 63 is provided in the wall of tube 61 just below top end member 64. Suitable conduits may be attached to each of these openings to connect the cell into a sampling line adjacent a pipeline as shown in Figure 1 for example. An insulating holder 72 having a threaded end portion 73 is screwed into a threaded central opening in end member 64. The lower end of holder 72 is furnished with a threaded central recess into which is screwed a threaded end 77 of a central metallic rod 76. The lower end of rod 76 is provided with a threaded projection 79 onto which is screwed a nonconducting tip portion 80. A number of ring gasket seals 70, 74, and 78 are employed to prevent leakage of liquid past the various parts that are fitted together as described. Since rod 76 is insulated from outer tube 61 by virtue of the nonconducting properties of holder 72, it will be seen that tube 61 and rod 76 can serve as the two plates of a capacitor. Electrical communication is established with rod 76 by means of conductor 75 passing down through holder 72. Suitable leads connected to the bridge circuit of Figure 1 may be attached to the two plates of the capacitor by connectors 82 and 83. Thus it will be seen that a fluid to be tested may be led into the cell through inlet 69 to flow in the annular space between rod 76 and tube 61 where it will serve as the dielectric of the capacitor. The fluid leaves the cell through outlet 63.

It is to be noted that tip 80 has a tapered point 81 centered on inlet 69. This ensures that the liquid entering the cell will be uniformly distributed in the annulus 84 between the tube 61 and rod 76. Preferably holder 72 and tip 80 are made of a suitable plastic material of high strength and good insulating qualities, such as laminated Bakelite-impregnated cloth.

The capacitor cell shown in Fig. 2 and described above has a number of advantageous features. For example, if instead of an insulating tip 80 on the bottom of rod 76 the tip were merely a continuation of the metal rod itself there would be a tendency for charges to collect on the tip and thus alter the effective capacitance of the capacitor. With an insulating tip as has been provided, the effective area of the capacitor plate represented by rod 76 is always uniform. Furthermore any tendency for wear due to the stream of liquid entering the cell is taken up by the plastic tip which is easily replaced. Also any change in dimension due to wear on the tip does not affect the capacitance reading since the tip is not an electrical component of the capacitor.

Still another advantage that is gained by use of the plastic tip is that the tip distributes any droplets of moisture that may be present in the liquid uniformly throughout the liquid before the moisture has had an opportunity to reach any of the electrically effective parts of the capacitor. Earlier capacitors of this type in which the central rod equivalent to rod 76 was held in place by plastic spacers inserted in the annulus 84 were found to be unsatisfactory in that they cause instrument drift when employed in measuring power factor and dielectric constant of crude oils in a bridge circuit as described in connection with Fig. 1. This was believed to be caused by collection of moisture on the plastic spacers, resulting in an increase in the conductivity between the two plates of the capacitor.

It has previously been proposed in capacitor cells of similar design to enclose the central rod in a plastic sheath in order to minimize conductivity effects. This expedient is not satisfactory, however, because it makes the cell more difficult to assemble. Furthermore the slight solvent-action exerted by petroleum liquids tends to soften the plastic material and promote rapid wear of the sheath, the resulting volume change between the plates affecting the electrical values of the capacitor and introducing a drift factor. Similar proposals have included coating the interior metal parts with lacquers and related compositions to reduce corrosion and conductivity effects but such coatings have not proved satisfactory because of poor wearing qualities, lack of sufficient adhesivity, and the like.

In the preferred embodiment of the invention both tube 61 and rod 76 are constructed of stainless steel. This material is advantageous not only because of its resistance to corrosion but also because it has been found to have less tendency than other metals to become water wet, thus making the capacitor less affected by slugs of water in the oil flowing through the pipeline.

It should be noted that inlet 69 and outlet 63 are both positioned beyond the ends of the central cylindrical rod 76. This ensures that conditions in the effective electrical area of the capacitor will be uniform and that eddy effects in the vicinity of the inlet or outlet will not influence the measurements being made.

As to the dimensions of the capacitor cell these are not particularly critical, except for the size of annular space 84. A spacing of about ⅛ to ¼ inch between tube 61 and central rod 76 is preferred. A clearance of less than ⅛" introduces the danger of small particles of sediment lodging in the space and affecting the reading. If the clearance is too great the sensitivity of the instrument will be adversely affected.

In general, the size of the capacitor cell should be such that several changes of liquid per minute can be realized during the use of the cell. This enables a check to be made on the extent of spread of contamination by admixture of adjacent batches in the pipeline. As an actual example a capacitor cell has been used having an overall length of 14 inches, the internal diameter of outer tube 61 being 2 inches, the diameter of central rod 76 being 1¾ inches and the length of the latter rod between non-conducting elements 69 and 72 being 8 inches. This provided a liquid volume in the electrically effective length of annular space 84 of 5.5 cubic inches, so that with a flow rate of one gallon per minute through the sampling line about 40 changes of liquid per minute were obtained in the capacitor cell.

It is intended that the scope of this invention not be limited by the foregoing description of specific embodiments thereof but solely by the appended claims.

What is claimed is:

1. A capacitor cell for measuring the dielectric properties of a flowing stream of liquid comprising a cylindrical chamber of electrically conductive material provided with an inlet for liquid at one end and an outlet for liquid adjacent the other end, a plug of electrically non-conductive material inserted in said chamber adjacent said outlet end, a central cylindrical rod of electrically conductive material placed within said chamber and held in place by said plug in a manner defining an elongated annular space of substantially uniform cross section between said rod and the walls of said chamber, said annular space being devoid of structure other than said walls and said central cylindrical rod, said annular space communicating with said inlet and said outlet, a conical shaped end piece of electrically non-conducting material attached to the free end of said rod with its apex adjacent said inlet, and electrical conducting means connected to said central rod and insulated from said chamber.

2. Capacitor cell according to claim 1 in which said electrically conductive material is stainless steel.

3. A capacitor cell for measuring the dielectric properties of a flowing stream of liquid comprising a cylindrical chamber of electrically conductive material provided with a circular inlet for liquid positioned at one end of said chamber centrally of the longitudinal axis of said chamber and with an outlet for liquid adjacent the opposite end of said chamber, a cylindrical plug of electrically non-conductive material inserted in said chamber centrally thereof and adjacent said outlet end, said plug extending into said chamber beyond said outlet and defining with the walls of said chamber an annular space communicating with said outlet, a central cylindrical rod of electrically conductive material, of substantially the same diameter as said non-conductive plug, attached to said plug within said chamber in a manner defining with the walls of said chamber an elongated annular space of substantially uniform cross section coextensive with said first-named annular space, said annular space being devoid of structure other than said walls and said central cylindrical rod, a conical shaped end piece of electrically non-conductive material removably attached to the free end of said central rod with its apex adjacent said circular inlet and with its center in substantial alignment with the center of said inlet, and electrical conducting means connected to said central rod and insulated from said chamber.

FRANCIS M. BOWER.

REFERENCES CITED

The following references are of record in the file of this patent:

UNITED STATES PATENTS

| Number | Name | Date |
|---|---|---|
| 2,349,992 | Schrader | May 30, 1944 |
| 2,485,579 | Elliott | Oct. 25, 1949 |